United States Patent
Winters

(10) Patent No.: US 9,165,306 B2
(45) Date of Patent: *Oct. 20, 2015

(54) METHOD AND SYSTEM FOR GENERATING AND SHARING CUSTOMIZED PORTABLE CONSUMER DEVICES

(75) Inventor: Michelle Winters, Belmont, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 13/427,539

(22) Filed: Mar. 22, 2012

(65) Prior Publication Data

US 2012/0185377 A1  Jul. 19, 2012

Related U.S. Application Data

(62) Division of application No. 11/654,928, filed on Jan. 17, 2007, now Pat. No. 8,162,226.

(51) Int. Cl.
*G06K 5/00* (2006.01)
*G06F 17/00* (2006.01)
*G06F 19/00* (2011.01)
*G06Q 40/00* (2012.01)
*G06Q 30/02* (2012.01)
*G06Q 20/10* (2012.01)
*G06Q 30/06* (2012.01)
*G06Q 40/02* (2012.01)

(52) U.S. Cl.
CPC ............... *G06Q 30/02* (2013.01); *G06Q 20/10* (2013.01); *G06Q 30/0613* (2013.01); *G06Q 40/00* (2013.01); *G06Q 40/025* (2013.01)

(58) Field of Classification Search
CPC . G06Q 20/08; G06Q 20/085; G06Q 20/0855; G06Q 20/10; G06Q 20/105; G06Q 20/108; G06Q 20/355; G06Q 20/3558; G06Q 30/02; G06Q 30/0214; G06Q 30/0215; G06Q 30/0241; G06Q 30/0613; G06Q 40/00; G06Q 40/02; G06Q 40/025
USPC .......... 235/375, 379, 380, 487; 705/1, 26, 27, 705/35, 39, 42, 26.4, 26.41, 38
See application file for complete search history.

(56) References Cited

U.S. PATENT DOCUMENTS

| 5,970,478 | A | * | 10/1999 | Walker et al. ................... 705/35 |
| 6,018,718 | A | | 1/2000 | Walker et al. |
| 6,202,083 | B1 | | 3/2001 | Chrabaszcz |
| 6,422,462 | B1 | | 7/2002 | Cohen |

(Continued)

OTHER PUBLICATIONS

"One of a Card"; http://www.oneofacard.com/main.asp, 2007.

(Continued)

*Primary Examiner* — Thien M Le
*Assistant Examiner* — April Taylor
(74) *Attorney, Agent, or Firm* — Kilpatrick Townsend & Stockton LLP

(57) ABSTRACT

A method for receiving and presenting user-generated designs and sets of terms for portable consumer devices. The method provides for allowing a first person to create a customized design for a portable consumer device, and share the design with other consumers via a host site. Similarly, the method provides for allowing a first person to create and share a customized set of terms for the portable consumer device. Methods for receiving and distributing feedback for customized designs and sets of terms are included.

17 Claims, 8 Drawing Sheets

(56) References Cited

U.S. PATENT DOCUMENTS

| | | | |
|---|---|---|---|
| 6,434,534 B1 | 8/2002 | Walker et al. | |
| 7,072,455 B2 | 7/2006 | Diaz | |
| 7,243,842 B1 | 7/2007 | Leon et al. | |
| 7,328,173 B2 | 2/2008 | Taratino et al. | |
| 7,359,954 B2 * | 4/2008 | Friedman et al. | 709/217 |
| 7,360,692 B2 | 4/2008 | Zellner et al. | |
| 7,561,299 B2 | 7/2009 | Elarde et al. | |
| 7,689,504 B2 * | 3/2010 | Warren et al. | 705/38 |
| 8,550,359 B2 * | 10/2013 | Winters | 235/487 |
| 2001/0034646 A1 | 10/2001 | Hoyt et al. | |
| 2002/0069078 A1 | 6/2002 | Goldstein | |
| 2002/0178113 A1 | 11/2002 | Clifford et al. | |
| 2003/0074419 A1 | 4/2003 | VanderDrift | |
| 2005/0167487 A1 | 8/2005 | Conlon et al. | |
| 2006/0271860 A1 | 11/2006 | Walter | |
| 2007/0185795 A1 | 8/2007 | Petrime et al. | |
| 2008/0162271 A1 * | 7/2008 | Benjamin | 705/10 |
| 2010/0179888 A1 * | 7/2010 | Warren et al. | 705/27 |
| 2010/0280948 A1 * | 11/2010 | Cohen | 705/42 |
| 2010/0312699 A1 * | 12/2010 | Phillips et al. | 705/41 |
| 2013/0179333 A1 * | 7/2013 | Constantine | 705/38 |
| 2015/0073975 A1 * | 3/2015 | Bornhofen et al. | 705/38 |

OTHER PUBLICATIONS

"One of a Card"; http://www.oneofacard.com/step1.asp, 2007.
"One of a Card"; http://www.oneofacard.com/step2.asp, 2007.
"One of a Card"; http://www.oneofacard.com/step3.asp, 2007.

* cited by examiner

METHOD AND SYSTEM FOR GENERATING AND SHARING CUSTOMIZED PORTABLE CONSUMER DEVICES

CROSS-REFERENCES TO RELATED APPLICATIONS

This application is a divisional application of U.S. patent application Ser. No. 11/654,928, filed Jan. 17, 2007, entitled "Method and System for Generating and Sharing Customized Portable Consumer Devices," which is hereby incorporated by reference, as if set forth in full in this document, for all purposes.

BACKGROUND

Personalizing portable consumer devices such are credit cards is known. For example, the practice of allowing customers to choose from a number of predetermined designs for their portable consumer devices is known. More recently, some card issuers have begun offering further customization options, such as the ability to include a company logo or personal photograph on the surface of a credit card.

For the most part, however, the customization options available to a consumer are limited either to designs generated by employees of an issuer, or to content provided by the consumer. It would be desirable if consumers had more design options to choose from.

Further, portable consumer devices are typically subject to specific terms of use set by issuers. Credit cards, for example, are typically subject to terms which include the interest rate charged on balances, specific rewards offered for using them to make purchases, fees charged for various services provided, etc. Such terms are generally not customizable by consumers. A need thus exists for consumers to be able to generate customized sets of terms for portable consumer devices. It would also be desirable to allow consumers to share created sets of terms with other consumers.

Embodiments of the invention address these and other problems, individually and collectively.

SUMMARY

Embodiments of the invention are directed to systems and methods for allowing consumers to generate customized designs and/or generate customized sets of terms for portable consumer devices, and to share these customized designs and/or sets of terms with others.

One embodiment of the invention is directed to a method for allowing a first person to generate a customized design for a portable consumer device. The first person may be a customer of the issuer of the portable consumer device, although this is not necessary. The customized design could determine some or all of the appearance of the portable consumer device.

Once a customized design has been generated and uploaded to a host site (e.g., a Web site), the issuer can make it available to other consumers, who may request portable consumer devices with the customized design.

In another embodiment, the issuer may allow the first person to charge a fee for obtaining a portable consumer device with the customized design. The issuer may also choose to retain a portion of this fee.

In a further embodiment, a Web site may receive feedback from other consumers regarding the custom design generated by the first person. The Web site may then make this feedback available to other consumers.

Another embodiment of the invention is directed to a method for allowing a first person to generate a customized set of terms for a portable consumer device. As discussed above, the first person may be a customer of the issuer of the portable consumer device, although this is not necessary. The terms could include elements such as the interest rate charged, rewards given for use of the device, fees charged for various services associated with the device, etc.

Once the customized set of terms has been generated, the issuer can make it available to other consumers, who may request portable consumer devices governed by the customized set of terms. The set of terms may also be used in a customized portable consumer device by the consumer who generated the customized set of terms.

In another embodiment, the issuer may allow the first person to charge a fee to another person for obtaining a portable consumer device incorporating the customized set of terms. The issuer may also choose to retain a portion of this fee. Similarly, the issuer may, according to an embodiment of the invention, pay a commission to the first person when a second person receives a portable consumer device governed by the customized set of terms.

In a further embodiment, the issuer may receive feedback from other consumers regarding the customized set of terms generated by the first person. The issuer may then make this feedback available to other consumers.

Other embodiments of the invention may be directed to computer readable media. For example, another embodiment of the invention is directed to a computer readable medium comprising code for receiving a customized design for a portable consumer device from a first person, and code for allowing a second person to request a portable consumer device with the customized design.

These and other embodiments of the invention are described in further detail below.

DETAILED DESCRIPTION

Figure 1A:
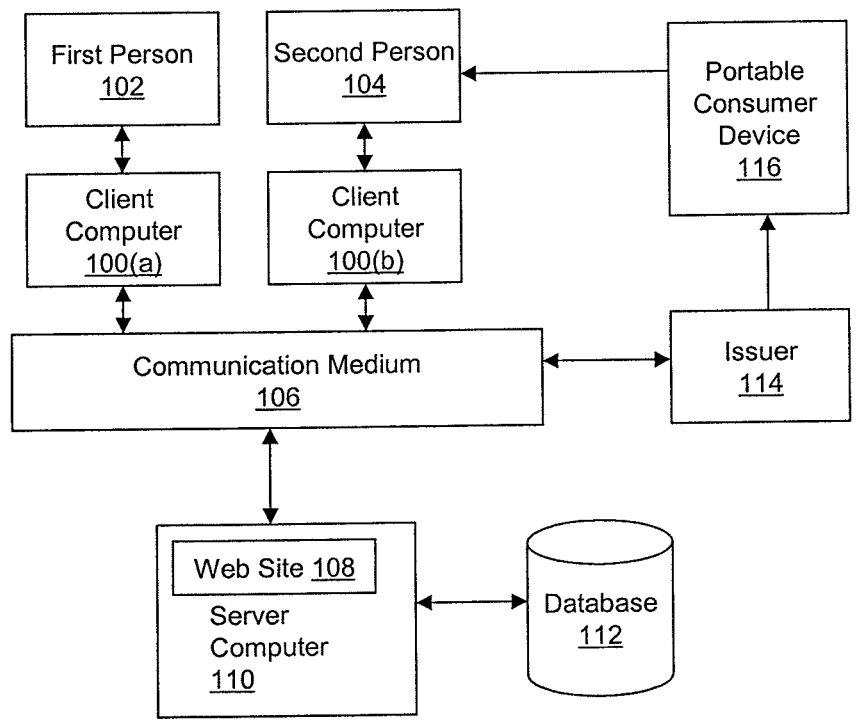
FIG. 1(a) is a block diagram showing a system according to an embodiment of the invention.

In recent years, the Internet has proven to be a popular medium for sharing ideas and opinions. In particular, a class of Web sites known as "social networking" sites has arisen as a widely popular means for this purpose. Well-known examples include Web sites such as MySpace and Friendster. These sites allow users to provide information about themselves to other users, to find other users with similar interests by searching this information, and to interact with each other in a variety of ways, including instant messaging, e-mail, message boards, etc. Another typical function of these sites is to allow users to share ratings or comments about products such as songs, movies, and books.

In a typical social networking community, an initial set of founders sends out messages inviting members of their own personal networks to join the site. New members repeat the process, growing the total number of members and links in the network. Sites then offer features such as automatic address book updates, viewable profiles, the ability to form new links through "introduction services," and other forms of online social connections. Social networks can also be organized around business connections.

It would be desirable to use such social networking Web sites in conjunction with portable consumer devices such as payment cards. Social networking Web sites can be used as tools for allowing consumers to view designs created by other consumers and to choose those designs for their portable consumer devices. Some embodiments of the invention allow users of the Web site to rate and comment on portable consumer device designs created by others.

One method according to an embodiment of the invention allows consumers to generate and share customized designs and/or sets of terms for portable consumer devices. The method can allow a first person to generate a customized design for a portable consumer device. The operator of a Web site (which may be operated by or affiliated with one or more issuers) receives the customized design from the first person. The operator then makes the design available to other consumers by publishing it on the Web site. After it is published on the Web site, a second person may then request a portable consumer device with the customized design via the host site. The issuer may then provide a portable consumer device with the customized design to the second person.

Other embodiments may be implemented using multiple Web sites. For example, one Web site operated by or affiliated with an issuer could handle the steps of receiving a customized design, reviewing the design, handling a request for a portable consumer device, and issuing the portable consumer device, while a separate social networking site handles publication of the design, collecting feedback, and publishing the feedback. Other embodiments may divide the various steps of the invention between two or more Web sites in different ways. All such divisions and combinations fall within the scope of the invention.

In addition to, or as an alternative to such embodiments, in some cases, a first person may generate a customized set of terms for a portable consumer device. The customized set of terms may then be published on the host site and requested by a second person as described above. Alternatively, the second person may select his or her own customized set of terms for his or her customized portable consumer device.

Embodiments of the invention also provide for allowing feedback to be given by consumers regarding the customized designs and customized sets of terms published on the host site. The issuer or some other entity may then make this feedback available to consumers by publishing it on the host site.

FIG. 1(a) is a block diagram showing a system according to an embodiment of the invention. The system includes one or more client computers 100(a), 100(b) in operative communication with a server computer 110 operating a Web site 108, via a communication medium 106. The server computer 110 may have access to a database 112. The server computer 110 may be operated by, or affiliated with, the issuer 114, an intermediate payment processing organization (not shown), or some other suitable entity.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. A server computer services the requests of one or more client computers.

The server computer 110 may also directly or indirectly communicate with the issuer 114. The issuer 114 is typically a business entity (e.g., a bank) which issues portable consumer devices such as credit or debit cards consumers.

The communication medium 106 may use any suitable wired or wireless network, including the Internet. Although the communication medium 106 is shown as being separate from the server computer 110 in FIG. 1(a), the communication medium 106 may alternatively include the server computer 110 in other embodiments. The communication medium 106 may also comprise a payment processing network such as VisaNet. Suitable payment processing systems can process ordinary credit and debit card transactions, and can clear and settle transactions on a daily basis.

The one or more client computers 100(a), 100(b) may include any suitable commercially available computation apparatuses with suitable commercially available Web browsers. Suitable client computers include Windows™ based computers.

A first person 102 and a second person 104 may operate the client computers 100(a), 100(b), and may visit the Web site 108. The first person 102 and second person 104 may be any suitable individual or entity. For example, the first person 102 and/or the second person 102 may be ordinary consumers who are customers of the issuer 114. However, this is not necessary, and preferred embodiments will allow non-customers to generate designs for use by new or existing customers of the issuer 114.

FIG. 1(a) also shows a portable consumer device 116 that is eventually sent to the second person 104. The portable consumer device 116 may be in any suitable form. For example, suitable portable consumer devices can be handheld and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit or prepaid devices (e.g., a debit card or prepaid card), credit devices (e.g., a credit card), or stored value devices (e.g., a stored value card).

It is understood that the block diagram in FIG. 1(a) is simplified for simplicity of illustration. In other embodiments, there may be more or less components than are specifically illustrated in FIG. 1(a).

Figure 1B:
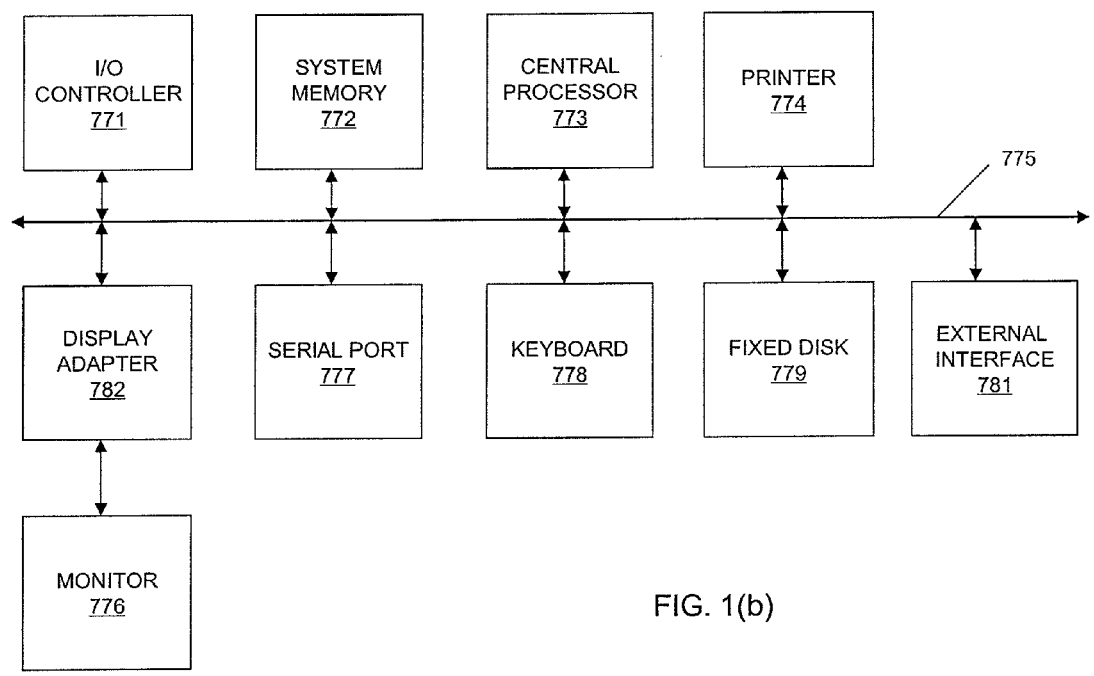
FIG. 1(b) is a block diagram showing subsystems in a typical computer apparatus.

FIG. 1(b) shows typical components or subsystems of a computer apparatus. Such components or any subset of such components may be present in the server computer 110, client computers 100(a), 100(b), or any entity. The subsystems shown in FIG. 1(b) are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems.

The system memory 772 and/or the fixed disk 779 may embody a computer readable medium.

Figure 2A:
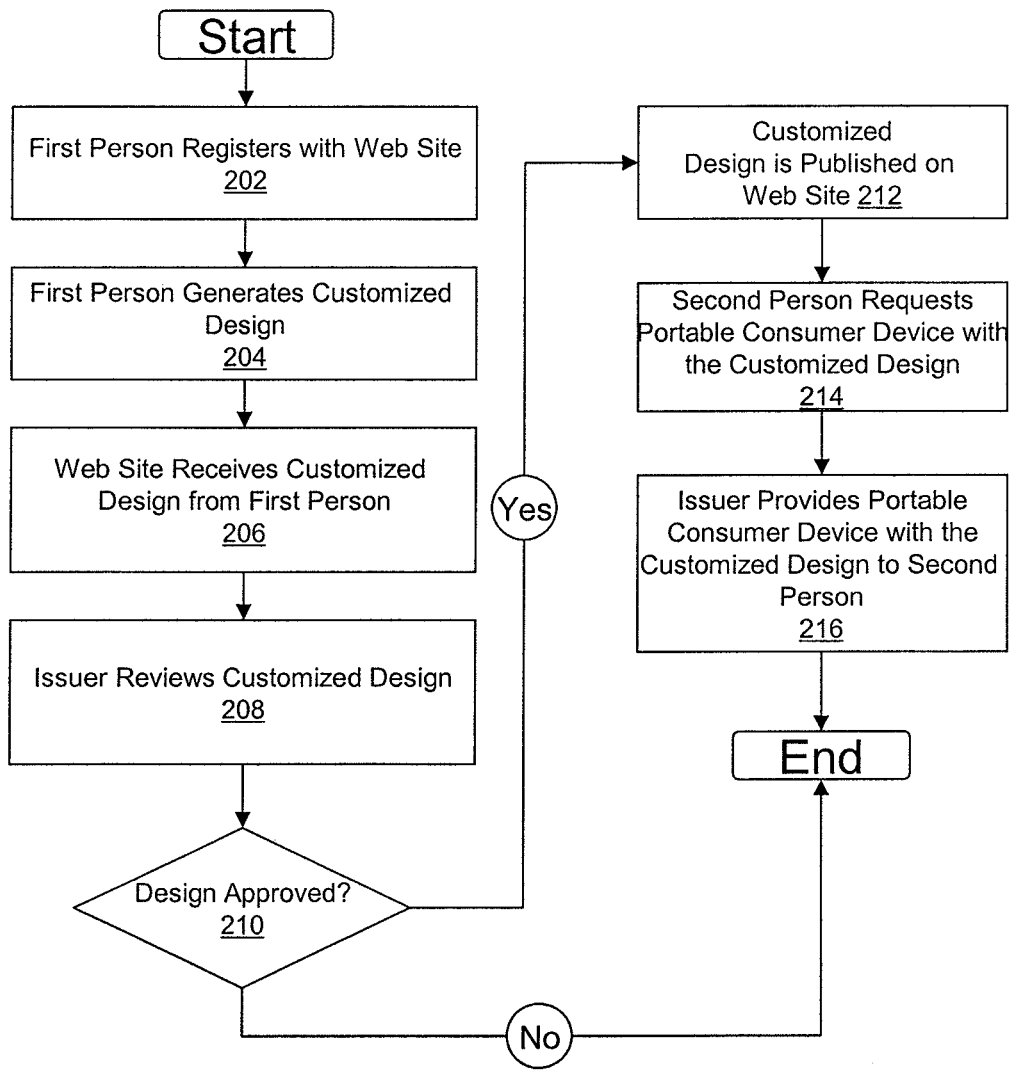
FIGS. 2(a)-2(b) are flowcharts showing methods according to another embodiment of the invention.

FIG. 2(a) is a flowchart illustrating a method according to an embodiment of the invention. The method shown in FIG. 2(a) can be described with reference to FIG. 1.

In the first step 202, a first person 102 registers with a host site such as the Web site 108. This registration could occur via a Web form, a telephone system, a paper form, or any other suitable means.

In the next step 204, the first person 102 generates a design for a portable consumer device. This may be accomplished in a variety of different ways. For example, the first person could generate a digital image using commercially available image editing tools. Similarly, the first person could scan a photograph to generate a digital image representing the desired appearance of the portable consumer device. Other embodiments according to the invention could allow the user to send in one or more physical photographs to serve as the design. Alternatively, a software tool could be provided which presents a predetermined set of elements such as colors, shapes, and symbols, to be selected and arranged by the first person. The software could be provided by a company that performs photo processing, and that company may work in conjunction with the issuer 114. Various combinations of these and other approaches could also be used.

In some embodiments, the design generated by the first person 102 could depict the proposed appearance of the portable consumer device in its entirety. In other embodiments, the design could determine a predetermined portion of the appearance of the device (e.g. one side of a credit card).

Once the design has been created (step 204), the first person 102 provides it to the Web site 108 (step 206). This could done in any suitable manner, including, uploading the design via a Web site, e-mailing it to the operator of the Web site 108, or sending in physical copies of designs to the operator of the Web site 108. The design may be stored with other designs in the database 112.

In the next step 208, the design may optionally be reviewed by the issuer 114 to determine if it should be approved for use with a portable consumer device. This step can be used to prevent inappropriate or offensive images from appearing on portable consumer devices associated with the issuer. The review process may vary according to the needs and policies of the issuer 114.

Figure 2B:
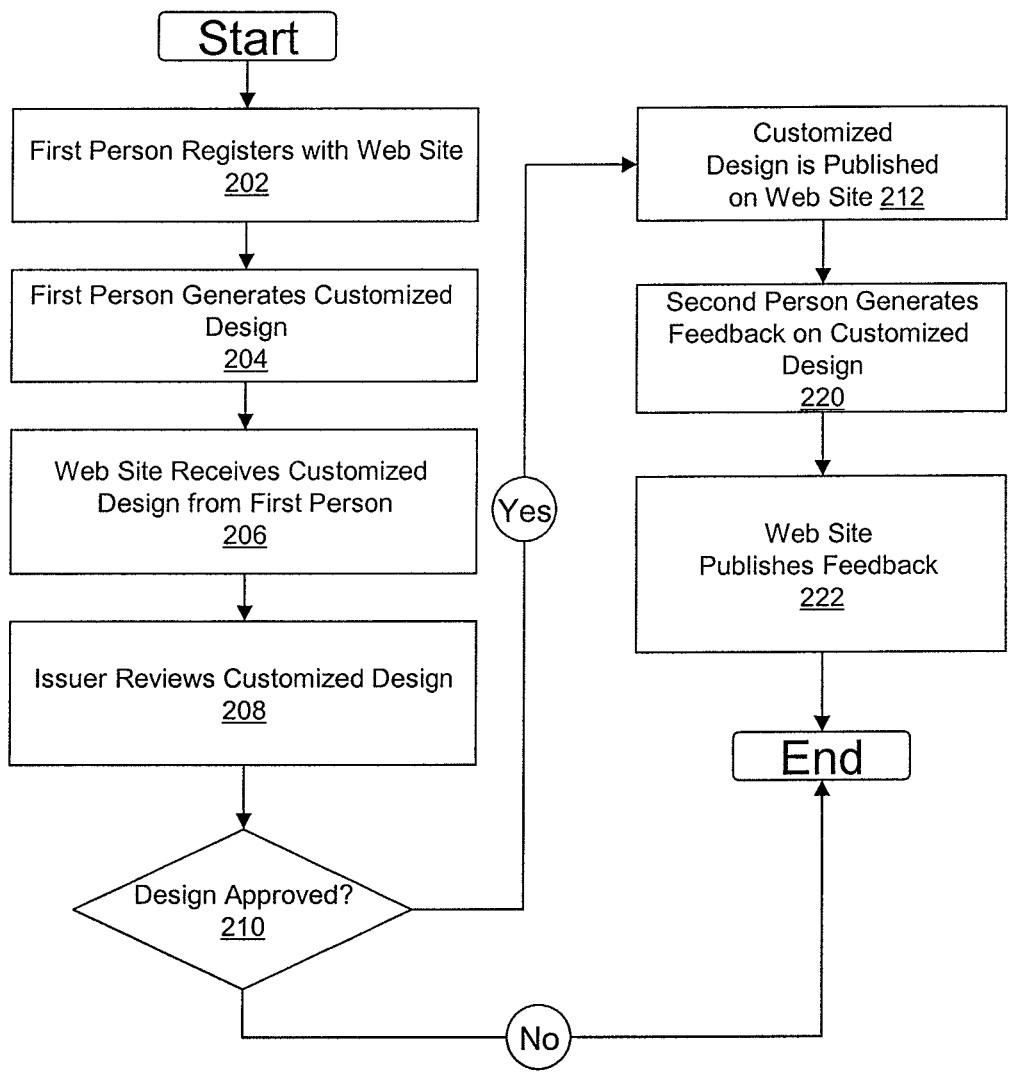

If the customized design is approved (step 210) by the issuer 114, the method proceeds to the next step 212, wherein it makes the design available to other consumers via the Web site 108. (At this point, some embodiments of the invention will allow consumers to generate and share feedback for the design, as depicted in FIG. 2(b). See the description below.)

Once the customized design is published on the Web site (step 212), the next step 214 comprises allowing a second person 104 to request a portable consumer device 116 with the customized design. The request could take a variety of different forms, such as submission of a Web form, a telephone call, a physical letter, or any other method by which the operator of the Web site 108 accepts requests for portable consumer devices.

Once the request has been made by the second person 104, the method concludes with the final step 216, in which the issuer 114 provides the requested portable consumer device to the second person 104. This can be done in any suitable way, and may vary depending on the policies and procedures of the issuer 114, and the type of portable consumer device being issued. For example, the issuer 114 may charge the second person 104 a fee for creating the customized portable consumer device 116, and the customized portable consumer device 116 may be sent to the consumer via U.S. mail, overnight courier, etc.

Note that it is not necessary for the second person 104 to receive a portable consumer device with the customized design. The method allows for consumers to create designs solely for the use and enjoyment of others. If the second person 104 does receive a portable consumer device 116 with a customized design, some embodiments of the invention may include the additional step of allowing the first person 102 to collect a fee from the second person 104 for the right to use the customized design. The issuer 114 may elect to keep a portion of this fee and/or may charge an additional fee to the second person 104 to obtain the customized portable consumer device 116. These embodiments have the advantage of motivating the first person 102 to market the portable consumer device 116 to other consumers in order to earn a profit from customized designs generated.

FIG. 2(b) shows another method according to an embodiment of the invention. In FIG. 2(b), steps 202, 204, 206, 208, 210, and 212 are described above, and need not be repeated here. However, in the method in FIG. 2(b), after the proposed design is published on the Web site 108, the second person 104 can provide feedback on the proposed design via the Web site 108 (step 220). The Web site 108 may then publish feedback on the Web site 108 (step 222).

Figure 3:
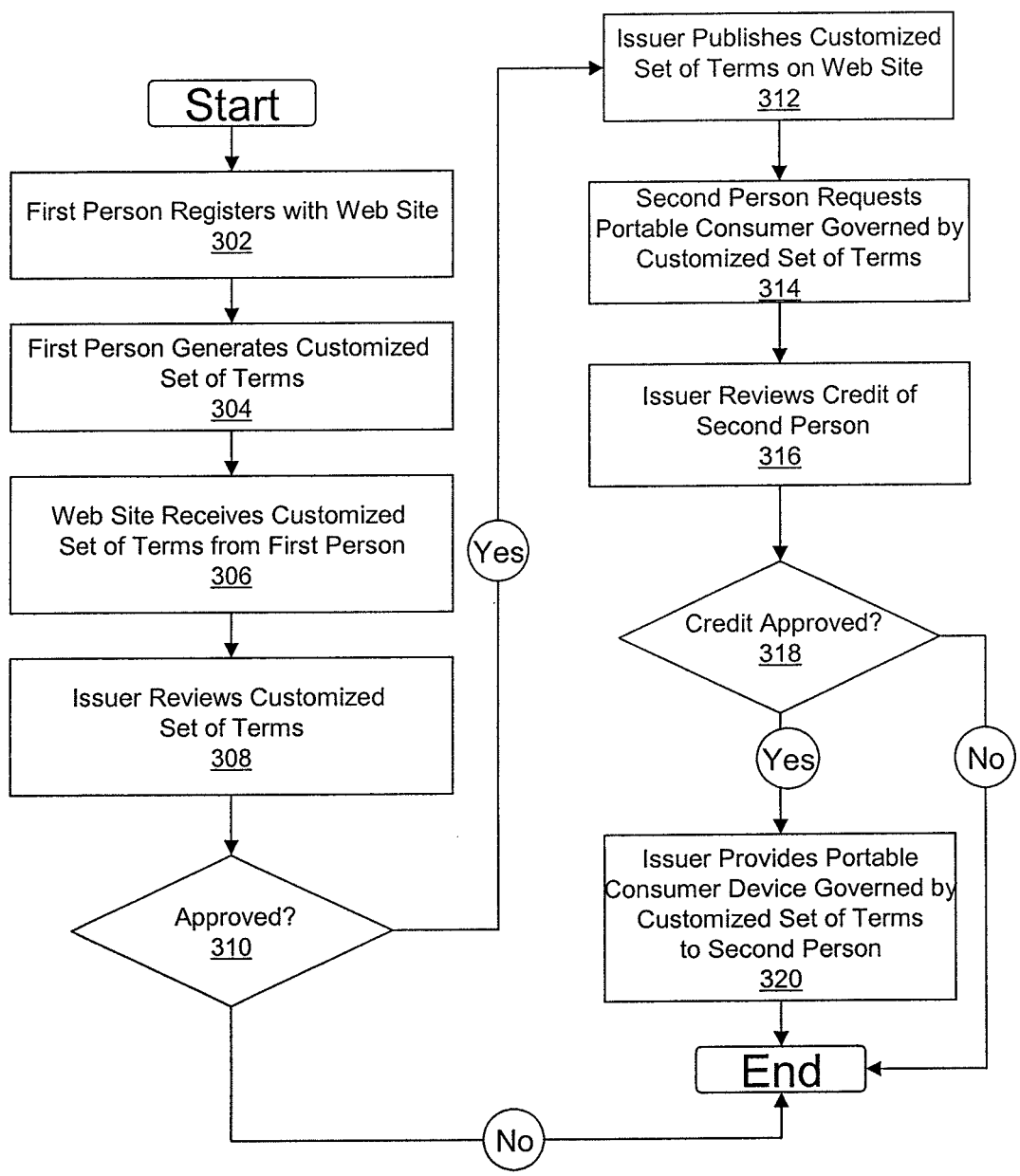
FIG. 3 is a flowchart showing a method according to another embodiment of the invention.

FIG. 3 is a flow chart depicting a method according to another embodiment of the invention. This embodiment is directed toward allowing consumers to create and share customized sets of terms for a portable consumer device. In the case of a credit card, for example, the customized set of terms could include elements such as the interest rate to be charged, the fees charged for various services associated with the portable consumer device, the rewards given for use of the portable consumer device, etc. Rewards may be differentiated according to specific merchants, amounts, time of use, etc. The available terms can vary based on the type of portable consumer device being issued, the policies, goals, and needs of the issuer, and the credit ratings of the first and second persons.

Referring to FIGS. 1 and 3, in the first step 302, a first person 102 registers with the Web site 108. In step 304, the first person 102 generates a customized set of terms for use with a portable consumer device 116. The terms can be generated in a variety of ways, including generating a simple textual document, filling out a Web form, selecting elements of a graphical user interface, etc. In the next step 306, the first person 102 provides the customized set of terms to the Web site 108. The set of customized terms can be provided to the Web site 108 by sending an email, submitting a web form, sending physical mail, etc. to the operator of the Web site 108. In some cases, the a number of proposed terms may be on the Web site 108 for the a person to choose from, and the person may chose a subset of the proposed terms on the Web site 108. Alternatively, the terms may be initially proposed by the person.

In the next step 308, the issuer 114 reviews the customized set of terms. This step can help ensure that the terms are consistent with the policies, needs, and goals of the issuer 114. If the terms are approved (step 310), they may then be published on the Web site 108 (step 312). At this time, the second person 104 may request a portable consumer device 116 governed by the customized set of terms (step 314). The request could take a variety of different forms, such as submission of a Web form, a telephone call, a physical letter, or any other method by which the issuer 114 accepts requests for portable consumer devices.

If desired, feedback may then be collected from other consumers for the customized set of terms, and published on the Web site 108. The feedback process can be similar to the feedback process that is described above with respect to FIG. 2(b), and need not be repeated here.

Once the request has been made (step 314), the issuer 114 evaluates the credit of the second person 104 (step 316), to ensure that the customized set of terms is appropriate for the second person 104 (step 318). The determination may vary based on the policies of the issuer 114, and the second person's credit history. If the request is approved, the method can end with step 320, wherein the issuer 114 provides a portable consumer device 116 governed by the customized set of terms to the second person 104. The means for this step can vary as described above for step 216 of FIG. 2(a).

Figure 4:
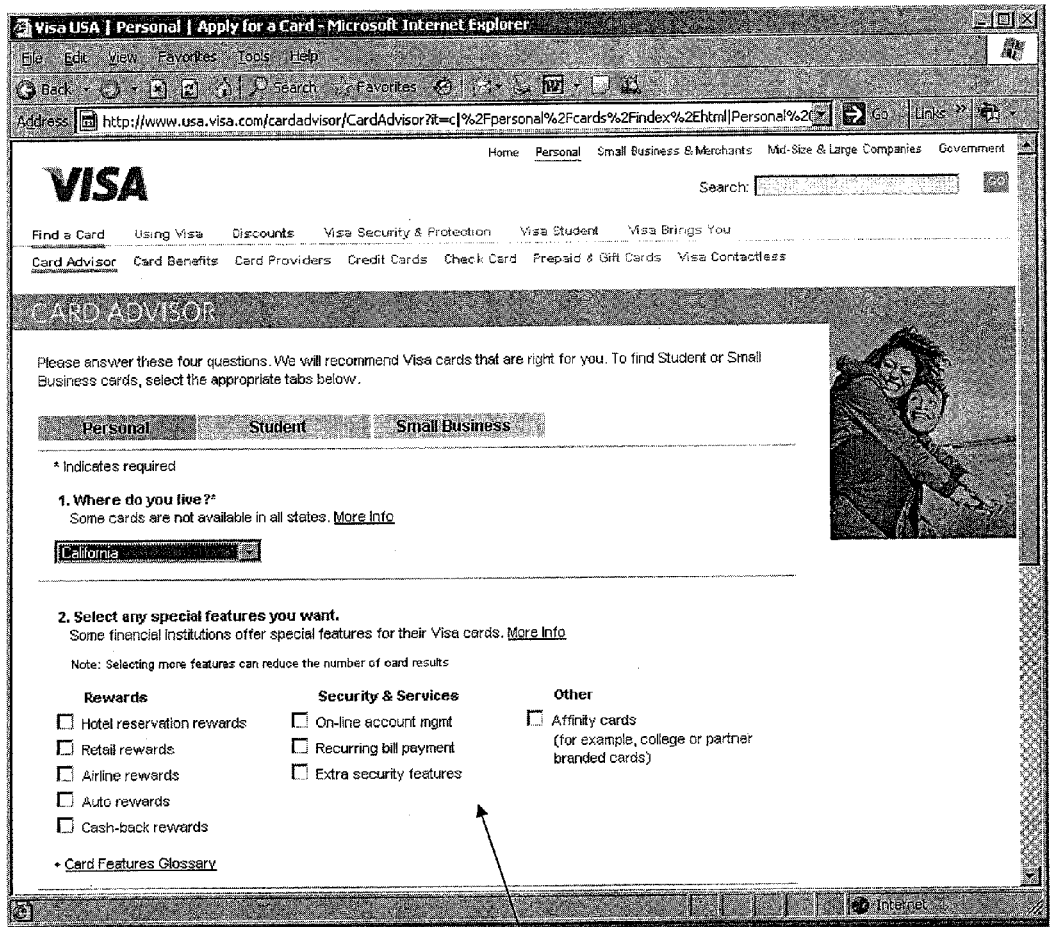
FIGS. 4-6 depict example Web pages from a Web site using at least one method according to the invention.

FIG. 4 depicts an example Web page from a Web site using at least one method according to the invention. On this page, the user is presented with a collection of terms 402 from which a customized set of terms may be selected. The customized sets of terms may relate to rewards (e.g., hotel reservation rewards, retail rewards, airline rewards, auto rewards, and cash-back awards), security and services (e.g., on-line account management, recurring bill payment, and extra features), Annual fees or APR, etc.

Figure 5:
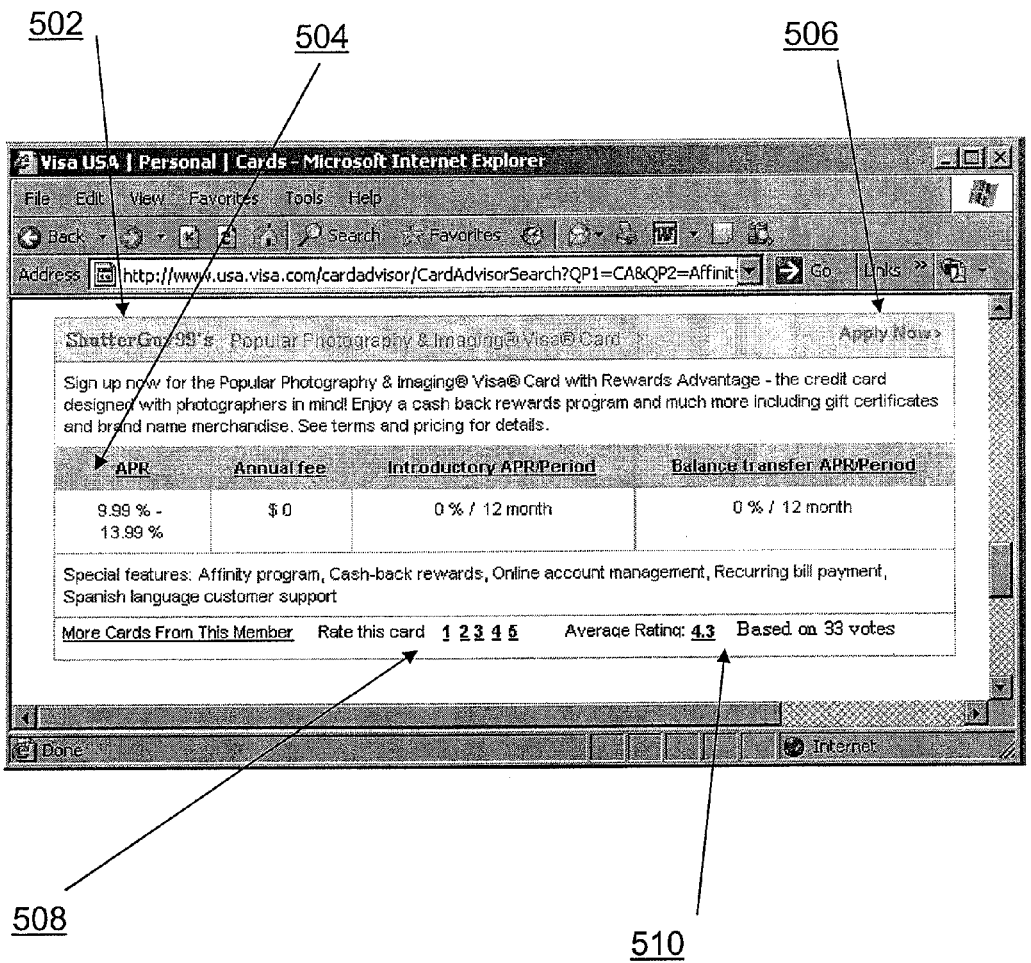

FIG. 5 depicts a second example Web page from a site using at least one method according to the invention. On this page, a summary of a customized set of terms 504, generated by a first person 502, is displayed. The page provides an option 506 to request a portable consumer device governed by the customized set of terms 504. At the bottom of the page is a feedback area, with a link 508 to provide feedback for the customized set of terms, and a summary 510 of the feedback provided by other users.

Figure 6:
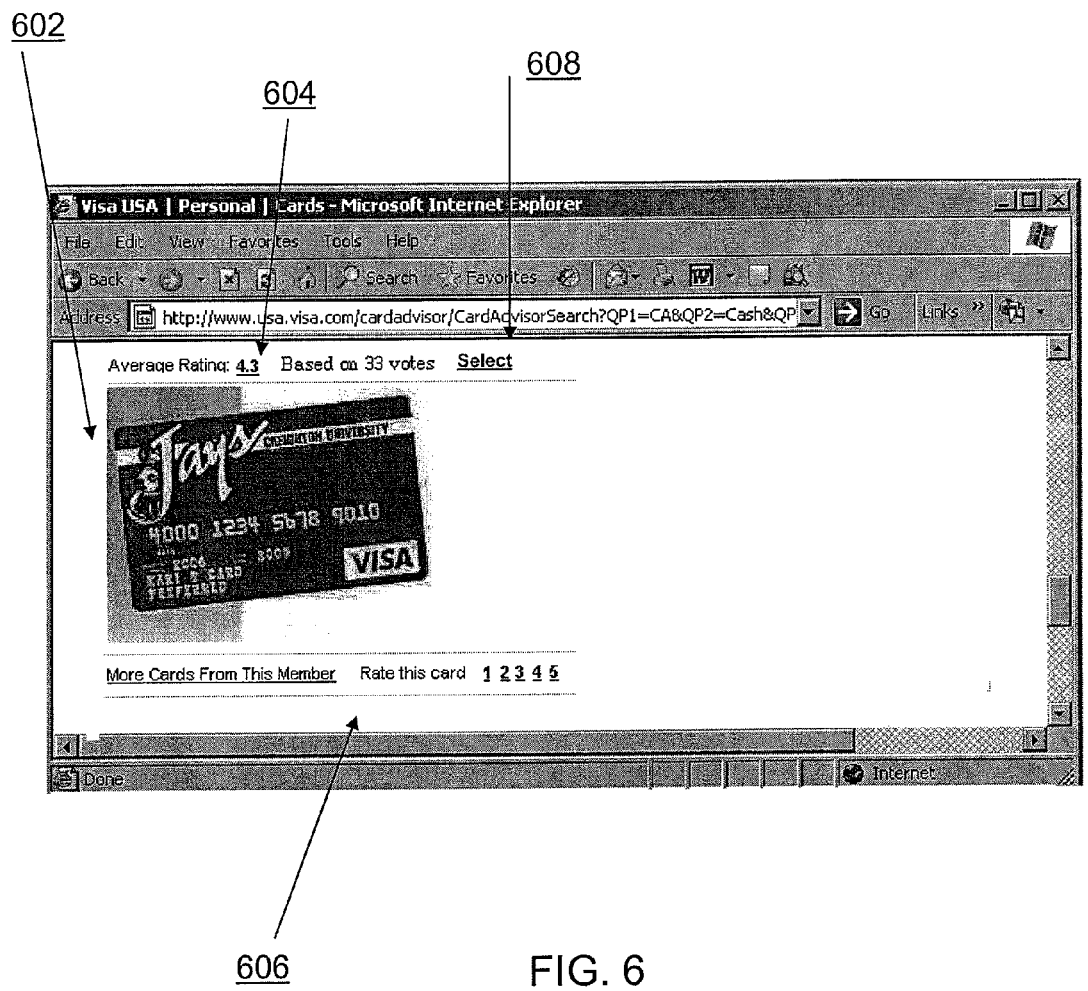

FIG. 6 depicts a third example Web page from a site using at least one method according to an embodiment of the invention. On this page, a custom design 602 for a portable consumer device is displayed, together with a link 608 with which a user may request a portable consumer device with the customized design. A link 606 is provided for the user to give feedback for the customized design, and a summary of feedback 604 provided by other users for the customized design is displayed.

Embodiments according to the invention have a number of advantages. First, they take advantage of the recent successes of social networking sites in general, which revolve around allowing users to generate content themselves, and build communities around their areas of interest. Second, embodiments according to the invention create incentives for consumers to create and market designs and sets of terms for portable consumer devices, which could result in a significant amount of new business for an issuer. In some cases, an issuer could hold a sweepstakes to allow the online community to vote on the design of the week, and this design could be part of an official offering by the issuer. Third, the portable consumer devices according to embodiments of the invention can be customized in terms of appearance and/or functionality, thereby making it more likely that consumers will use such portable consumer devices. Fourth, online communities can generate free publicity and interest around new card offerings, and additional revenue may come from ad sales or click-throughs on a Web site. Once interest is generated in the community, issuers can also up-sell or cross-sell other products to consumers, and they can market merchant offers to these communities. Fifth, the online social community can be a resource that can provide instant feedback and filtering as to the popularity of certain offers from merchants.

Any of the above-described methods or steps of such methods may be embodied as software code to be executed by a processor of the server computer or any other suitable combination of devices using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. A computer readable medium may be present in one or more computational apparatuses in embodiments of the invention.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

Any of the above-described embodiments and/or any features thereof may be combined with any other embodiment(s) and/or feature(s) without departing from the scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

What is claimed is:

1. A method comprising:
allowing, by a server computer, a first person to select a customized set of terms for a portable consumer device, wherein the server computer communicates with an issuer computer operated by an issuer that issues portable consumer devices to consumers, and wherein the portable consumer devices include payment cards;
allowing, by the server computer, a second person to request the portable consumer device governed by the customized set of terms, wherein the first and second persons are consumers, and wherein the issuer computer manages a payment account for the second person;
evaluating the second person's credit at the server computer or the issuer computer associated with the second person to ensure that the second person is eligible for the customized set of terms, wherein the portable consumer device is enabled to initiate a transfer of funds from the payment account for the second person during a transaction; and
initiating sending of the portable consumer device to the second person, wherein the customized set of terms are applied to transactions using the portable consumer device.

2. The method of claim 1, wherein the server computer operates a host site that allows the second person to select the portable consumer device governed by the customized set of terms.

3. The method of claim 1 further comprising publishing the customized set of terms on a social networking site.

4. A method comprising:
allowing, by a server computer, a first person to select a customized set of terms for a portable consumer device, wherein the server computer communicates with an issuer computer operated by an issuer that issues portable consumer devices to consumers, and wherein the portable consumer devices include payment cards;

allowing, by the server computer, a second person to request the portable consumer device from the issuer of the portable consumer device governed by the customized set of terms, wherein the first and second persons are consumers, wherein the issuer computer manages a payment account for the second person, and wherein the first person is a customer of the issuer computer; and allowing the first person, via a host site, to charge a fee to the second person for receiving the portable consumer device governed by the customized set of terms, wherein the portable consumer device is enabled to initiate a transfer of funds from the payment account for the second person during a transaction.

5. The method according to claim 4, further comprising allowing the first person to receive a portion of the fee.

6. The method of claim 4, wherein the payment cards are a credit card, debit card, prepaid card, or stored value card.

7. A method comprising:

allowing, by a server computer, a first person to select a customized set of terms for a portable consumer device, wherein the server computer communicates with an issuer computer operated by an issuer that issues portable consumer devices to consumers, and wherein the portable consumer devices include payment cards;

allowing, by the server computer, a second person to request the portable consumer device from an issuer of the portable consumer device governed by the customized set of terms, wherein the first and second persons are consumers, and wherein the first person is a customer of the issuer, and wherein the issuer computer manages a payment account for the second person;

initiating the sending of the portable consumer device to the second person, wherein the customized terms are applied to transactions using the portable consumer device; and paying the first person a commission when the second person receives the portable consumer device governed by the customized set of terms.

8. A method comprising:

allowing, by a server computer, a first person to select a customized set of terms for a portable consumer device, wherein the server computer communicates with an issuer computer operated by an issuer that issues portable consumer devices to consumers, and wherein the portable consumer devices include payment cards;

allowing, by the server computer, a second person to request the portable consumer device governed by the customized set of terms, wherein the first and second persons are consumers, and wherein the issuer computer manages a payment account for the second person; and publishing the customized set of terms on a host site by the server computer or the issuer computer associated with the second person, wherein the host site is a social networking site.

9. A method comprising:

allowing, by a server computer, a first person to select a customized set of terms for a portable consumer device, wherein the server computer communicates with an issuer computer operated by an issuer that issues portable consumer devices to consumers;

allowing, by the server computer, a second person to request the portable consumer device governed by the customized set of terms, wherein the first and second persons are consumers, and wherein the issuer computer manages a payment account for the second person, and wherein the portable consumer device is enabled to initiate a transfer of funds from the payment account for the second person during a transaction;

publishing the customized set of terms on a host site; and providing feedback on the host site by the server computer or the issuer computer associated with the second person, wherein the feedback comprises a textual comment, wherein the portable consumer device is in the form of a payment card.

10. A method comprising:

allowing, by a server computer, a first person to select a customized set of terms for a portable consumer device, wherein the server computer communicates with an issuer computer operated by an issuer that issues portable consumer devices to consumers;

allowing, by the server computer, a second person to request the portable consumer device governed by the customized set of terms, wherein the first and second persons are consumers, and wherein the issuer computer manages a payment account for the second person, wherein the portable consumer device is enabled to initiate a transfer of funds from the payment account for the second person during a transaction;

publishing the customized set of terms on a host site; and providing feedback on the host site by the server computer or the issuer computer associated with the second person, wherein the feedback comprises at least one numeric rating, wherein the portable consumer device is in the form of a payment card.

11. A method comprising:

allowing, by a server computer, a first person to select a customized set of terms for a portable consumer device, wherein the server computer communicates with an issuer computer operated by an issuer that issues portable consumer devices to consumers, and wherein the portable consumer devices include payment cards;

allowing, by the server computer, a second person to request the portable consumer device governed by the customized set of terms, wherein the first and second persons are consumers, wherein the issuer computer manages a payment account for the second person, wherein the customized set of terms includes an interest rate charged, and wherein the portable consumer device is enabled to initiate a transfer of funds from the payment account for the second person during a transaction; and initiating the sending of the portable consumer device to the second person, wherein the customized terms are applied to transactions using the portable consumer device.

12. A method comprising:

allowing, by a server computer, a first person to select a customized set of terms for a portable consumer device, wherein the server computer communicates with an issuer computer operated by an issuer that issues portable consumer devices to consumers, and wherein the portable consumer devices include payment cards;

allowing, by the server computer, a second person to request the portable consumer device governed by the customized set of terms, wherein the first and second persons are consumers, wherein the issuer computer manages a payment account for the second person, and wherein the customized set of terms includes one or more rewards provided for using the portable consumer device, wherein the portable consumer device is enabled to initiate a transfer of funds from the payment account for the second person during a transaction; and initiating the sending of the portable consumer device to the second person, wherein the customized terms are applied to transactions using the portable consumer device.

13. The method of claim 12, wherein the one or more rewards are selected from the group consisting of hotel reservation rewards, retail rewards, airline rewards, auto rewards and cash-back rewards.

14. A method comprising:

viewing, at a client computer operated by a second person, a customized set of terms created by a first person for use with a portable consumer device on a host site;

requesting, by the client computer operated by the second person to a server computer, the portable consumer device governed by the customized set of terms using the host site, wherein the server computer communicates with an issuer computer operated by an issuer that issues portable consumer devices to consumers, and wherein the portable consumer devices include payment cards; and receiving, by the second person, the portable consumer device governed by the customized set of terms, wherein the second person's credit is evaluated at the server computer or the issuer computer associated with the second person to ensure that the second person is eligible for the customized set of terms, wherein the issuer computer manages a payment account for the second person, and wherein the portable consumer device is enabled to initiate a transfer of funds from the payment account for the second person during a transaction.

15. A method comprising:

viewing, at a client computer operated by a second person, a customized set of terms created by a first person for use with a portable consumer device on a host site;

requesting, by the client computer operated by the second person to a server computer, the portable consumer device governed by the customized set of terms using the host site, wherein the server computer communicates with an issuer computer operated by an issuer that issues portable consumer devices to consumers, and wherein the portable consumer devices include payment cards; and receiving, by the second person, the portable consumer device governed by the customized set of terms, wherein the customized set of terms includes an interest rate charged, wherein the issuer computer manages a payment account for the second person, and wherein the portable consumer device is enabled to initiate a transfer of funds from the payment account for the second person during a transaction.

16. A method comprising:

viewing, at a client computer operated by a second person, a customized set of terms created by a first person for use with a portable consumer device on a host site;

requesting, by the client computer operated by the second person to a server computer, the portable consumer device governed by the customized set of terms using the host site, wherein the server computer communicates with an issuer computer operated by an issuer that issues portable consumer devices to consumers, and wherein the portable consumer devices include payment cards; and receiving, by the second person, the portable consumer device governed by the customized set of terms, wherein the customized set of terms includes one or more rewards provided for using the portable consumer device, wherein the issuer computer manages a payment account for the second person, and wherein the portable consumer device is enabled to initiate a transfer of funds from the payment account for the second person during a transaction.

17. The method of claim 16, wherein the one or more rewards are selected from the group consisting of hotel reservation rewards, retail rewards, airline rewards, auto rewards and cash-back rewards.

* * * * *